United States Patent Office 3,582,253
Patented June 1, 1971

3,582,253
DYEING HUMAN HAIR WITH
DIAZONIUM SALTS
Peter Berth, Dusseldorf-Benrath, and Rudolf Maul, Hilden-Rhineland, Germany, assignors to Therachemie chemisch therapeutische Ges. m.b.H., Dusseldorf, Germany
No Drawing. Filed Feb. 20, 1968, Ser. No. 706,758
Claims priority, application Germany, Mar. 14, 1967, T 33,431
Int. Cl. A61k 7/12
U.S. Cl. 8—10.1                                    7 Claims

ABSTRACT OF THE DISCLOSURE

Agents for the dyeing of hair, and particularly of living human hair, based on azo dyes. The dyes consist of a diazo- and a coupling component, which are caused to react with each other while on the hair. The diazo component consists of stable diazonium salts. Both components are applied in the form of aqueous solutions. Application to the hair can be carried out within 5 to 30 minutes and at temperatures of substantially 15 to 35° C., i.e., substantially at room temperature.

---

The invention relates to a process for dyeing of hair, particularly of living human hair, with developed dyes based on azo compounds. Lately, direct dyes are used, aside from those which only color in the presence of oxidizers, such as $H_2O_2$ or perborates. As direct dyestuffs, anthraquinone derivatives and certain azo dyes are employed. The direct azo dyes for use on human hair essentially produce light hues whereas dark brown to blue black intensive colorations frequently are desired.

It now has been found that the procedures hitherto employed can greatly be improved by the novel process as hereinafter described. Its salient feature resides in carrying out the reaction of the diazo- and the coupling component directly on the hair. Stable diazonium salts opportunely are utilized as diazo- or developer components (both terms being interchangeable). These salts are produced by diazotization of suitable primary aromatic amines, especially of aniline, benzidine, aminophenylamine and phenyldiamine. These compounds furthermore may contain substituents, such as phenyl-, alkyl-, alkoxy- and nitro groups, also halogen atoms.

Suitable stable diazonium salts are, e.g., diazonium sulfates and diazonium chloride, preferably in the form of their stable double salts. The latter form with heavy metal chlorides, e.g., those of cobalt, manganese, cadmium and particularly of zinc. Other usable stable diazonium salts are diazoniumtetrafluoroborates and diazonium salts of organic sulfonic acids, such as naphthalenedisulfonic acid or chlorobenzenesulfonic acid.

Suitable developer components are benzenediazonium salts, diphenylaminodiazonium salts or azobenzene diazonium salts, also double salts of these compounds.

Benzenediazonium salts may be substituted in the benzene ring by methyl-, ethyl- methoxy-, ethoxy-, phenoxy-, nitro-, amino-, methylsulfonyl- or ethylsulfonyl groups, or by halogen atoms, particularly chlorine.

The diphenylaminodiazonium salts can be substituted in one or both rings by methyl-, ethyl-, methoxy-, ethoxy- or amino groups.

Azobenzenediazonium salts may be substituted by methyl-, ethyl-, methoxy-, ethoxy-, nitro- or amino groups, also by halogen atoms, particularly chlorine.

The following developer components are especially usable and constitute preferred embodiments, all of them selected from the three major groups named above:

benzenediazoniumchloride
2-chlorobenzenediazoniumchloride
3-chlorobenzenediazoniumchloride
2,5-dichlorobenzenediazoniumchloride
2,6-dichloro-4-aminobenzenediazoniumchloride
4-nitrobenzenediazoniumchloride
2-nitro-4-chlorobenzenediazoniumchloride
2-phenoxy-5-chlorobenzenediazoniumchloride
2-methoxy-5-chlorobenzenediazoniumchloride
2-methoxy-5-ethylsulfonylbenzenediazoniumchloride
2-methoxy-5-nitrobenzenediazoniumchloride
2-methoxy-4-(N-phenyl)-amino-5-methylbenzenediazoniumchloride
2,5-diethoxy-4-(N-phenyl)-aminobenzenediazoniumchloride
2-methoxy-4-(N-phenyl)-benzenediazoniumchloride
4'-methoxydiphenylaminediazoniumchloride
4-(N-phenyl)-aminobenzenediazoniumchloride
4'-aminodiphenylaminodiazoniumchloride
4'-nitro-4-azobenzene-2,5-dimethoxydiazoniumchloride
2',6'-dichloro-4'-nitro-4-azobenzene-2,5-dimethoxy-diazoniumchloride
2'-chloro-4'-nitro-4-methyl-5-methoxy-2-azobenzene-diazoniumchloride
2'-methyl-4-azobenzene-2-methyldiazoniumchloride
3'-methyl-4-azobenzene-3-methyldiazoniumchloride
2'-nitro-4'-methyl-4-azobenzene-2-methoxy-5-methyl-diazoniumchloride.

It should again be pointed out that the double salts of these compounds can equally well be used in lieu of the chlorides which have hereinbefore been named merely for the sake of convenience.

The developer components are applied in the form of acidic or neutral aqueous solutions which preferably have a pH ranging from 3 to 7.

It is feasible to utilize technical grade materials for the purpose at hand. These generally contain a certain quantity of inorganic salts, particularly neutral salts such as NaCl or sodium sulfate. These salts do not detract from the performance.

It has generally been found opportune to treat the hair first with aqueous solutions of the coupling components. These solutions may have a pH between 3 and 10, preferably between 7 and 10.

Suitable coupling components are aromatic compounds containing hydroxyl or amino groups, also 1-phenyl-3-methyl-pyrazoline-5. Amines, diamines, phenols, naphthols, polyphenols and aminophenols hence are usable. When aromatic diamines, aminophenols and phenols are employed, their ortho- and meta compounds are preferred. The following couplers should be named, without limitation thereto:

| | |
|---|---|
| m-phenyldiamine | pyrogallol |
| o-phenyldiamine | resorcinol |
| m-aminophenol | 1,2-dihydroxybenzene |
| o-aminophenol | aminoresorcinol |
| o-anisidine | 1,5-dihydroxynaphthalene |
| 2,4-diaminoanisol | 1,5-aminohydroxynaphthalene |
| 2,3-diaminotoluene | 1,8-aminohydroxynaphthalene |
| 2,4-diaminotoluene | alpha-naphthol |
| 2,4-diaminophenol | 1-phenyl-3-methylpyrazolone-5 |

The coupling components opportunely are used in molar quantities relative to the developer components. However, a certain excess of the latter is not harmful.

It is opportune, but not mandatory, to rinse the hair after application of the solution of the coupling component for approximately 5 to 30 minutes, with water.

This then is followed by application of the acid or neutral solution of the developer component.

It also is feasible, however, to apply the two solutions practically at the same time. It furthermore is possible to mix the two solutions; however, this must be done immediately prior to application to the hair so that the reaction still occurs on the hair, and not before hand.

Effective amounts are aqueous solutions wherein the concentration of developer and coupling components amounts to 0.5 to 5 weight percent and preferably 1 to 4 percent, calculated on the total composition. Dyeing is accomplished at substantially 15 to 40° C., and preferably at room temperature.

Both the components can be employed, aside from solutions, in the form of aqueous creams or emulsions by addition of suitable detergents, washing agents and similar surface-active materials. Particularly suited are nonionic detergents such as ethylene oxide adducts on fatty acids or fatty alcohols, and surface active aminoxides.

The solutions, creams or emulsions also may contain thickeners, e.g., methylcellulose, starch, higher fatty alcohols, vaseline, paraffin oil and fatty acids; furthermore perfumes (essential oils) and hair grooming agents such as pantothenic acid and cholesterol. These additives are employed in the commonly effective quantities, e.g., 0.5 to 30 weight percent detergents and 0.1 to 25 weight percent thickeners both calculated on the total composition.

The novel process according to the invention may readily be used to dye grey hair and to recolor dyed hair. The colors attained are very intensive and display good compatibility with hair waving agents, especially cold waving agents.

The invention now will be more fully explained by the following examples. However, it should be understood that these are given merely by way of illustration, and not of limitation, and that it is intended to cover all modifications and variations which do not constitute departures from the spirit and the scope of the invention as hereinafter claimed.

All parts and percentages are by weight. Temperatures are degrees centigrade. The solutions are aqueous.

EXAMPLE 1

1 part alpha-naphthol was dissolved in 100 parts water, and the solution adjusted to a pH of 9.5 with ammonia. Living grey hair was treated with this solution at room temperature for 20 minutes. After a short water rinse, a solution was applied to the hair consisting of 1 part 4-(N-phenyl)-aminobenzenediazoniumchloride-zinc salt in 100 parts water, adjusted to a pH of 6.5. After 20 minutes, the hair assumed a strong black color.

EXAMPLE 2

Results of dyeing of hair are listed in Table 1. The modus operandi was the same as in Example 1, but the solutions differed as shown in the table.

EXAMPLE 3

2 parts 2,4-diaminoanisol were dissolved in 100 parts water and adjusted to a pH of 4.5. A second solution was a 2 percent solution of 4'-nitro-2,5-dimethoxy-4-azobenzenediazoniumchloride-zinc chloride salt whose pH also was adjusted to 4.5. Immediately prior to application to living grey hair, equal parts of the solutions were mixed and allowed to act on the hair at room temperature for approximately 25 minutes. The hair thereby was dyed to a strong dark brown.

EXAMPLE 4

A 2 percent 2,4-diaminotoluene solution was adjusted to a pH of 3. A 2% 4-(N-phenyl)-aminobenzenediazonium tetrafluoroborate solution was adjusted to a pH of 3, also. Both solutions were applied to grey hair simultaneously and allowed to act thereon at room temperature for approximately 30 minutes. A medium strong purplish black color thus was obtained.

Equivalent results were obtained by using any of the other coupling and developer components hereinbefore named.

The use of the materials in cream or emulsion form produced equal results with those employed in straight aqueous solutions.

We claim as our invention:

1. A process for the dyeing of human hair which consists essentially of applying to said hair at temperatures ranging substantially from 15° to 35° C. and for a time sufficient to effect dyeing, a first aqueous solution containing from 0.5 to 5% by weight of a conventional coupling component selected from the group consisting of aromatic compounds containing hydroxyl groups, amino groups and mixtures of hydroxyl and amino groups, and 1-phenyl-3-methyl-pyrazolone-5; and a second aqueous solution containing from 0.5 to 5% by weight of a stable aromatic diazonium salt selected from the group consisting of benzenediazonium salts and benzenediazonium salts substitued in the benzene ring by groups selected from the group consisting of methyl, ethyl, methoxy, ethoxy, phenoxy, nitro, amino, methylsulfonyl, ethylsulfonyl, halogen and mixtures thereof, diphenylaminodiazonium salts and diphenylaminodiazonium salts substituted in at least one phenyl ring by groups selected from the group consisting of methoxy, ethoxy, amino, and mixtures thereof, azobenzenediazonium salts and azobenzenediazonium salts substituted in the benzene ring by groups selected from the group consisting of methyl, ethyl, methoxy, ethoxy, nitro, halogen and mixtures thereof; said stable diazonium salt anion being selected from the group consisting of sulfate, chloride, chloride double salt with cobalt chloride, chloride double salt with manganese chloride, chloride double salt with cadium chloride, chloride double salt with zinc chloride, tetrafluoroborates, naphthalenedisulfonates and chlorobenzenesulfonates.

2. The process as defined in claim 1, wherein said time is substantially 5 to 30 minutes.

3. The process as defined in claim 1, wherein said first and second solutions are applied in succession.

TABLE 1

| No. | Diazonium salt (as ZnCl₂ double salt) | pH | Coupling compound | pH | Color |
| --- | --- | --- | --- | --- | --- |
| 1 | 4'-nitro-2,5-dimethoxy-4-azobenzenediazoniumchloride | 3.0 | Alpha-naphthol | 8.0 | Grey-brown. |
| 2 | 2,5-dichlorobenzenediazoniumchloride | 4.5 | do | 8.5 | Soft brown. |
| 3 | 2,5-diethoxy-4-(N-phenyl)-aminobenzenediazoniumchloride | 5.0 | Resorcinol | 10.0 | Do. |
| 4 | 4'-nitro-2,5-dimethoxy-4-azobenzenediazoniumchloride | 3.5 | do | 9.0 | Grey-brown. |
| 5 | 2',6'-dichloro-4'-nitro-2,5-dimethoxy-4-azobenzenediazoniumchloride | 3.0 | do | 8.0 | Brown. |
| 6 | 4-(N-phenyl)-aminobenzenediazoniumchloride | 7.0 | do | 9.5 | Yellowish brown. |
| 7 | 4'-aminodiphenylaminediazoniumchloride | 5.5 | do | 7.0 | Black. |
| 8 | 2-methoxy-4-(N-phenyl)-aminobenzenediazoniumchloride | 5.0 | do | 10.0 | Red-brown. |
| 9 | 2,5-diethoxy-4-(N-phenyl)-aminobenzenediazoniumchloride | 7.0 | 2,4-diaminoanisol | 8.0 | Brown. |
| 10 | 4'-aminodiphenylaminediazoniumchloride | 3.0 | do | 9.5 | Dark brown. |

Likewise very good dyeings of hair with intensive colors were obtained by using any of the other coupling components, named in the description instead of the above listed coupling components.

4. The process as defined in claim 3, wherein a water rinse is applied between the application of said solutions.

5. The process as defined in claim 1, wherein both solutions are applied simultaneously.

6. The process as defined in claim 1, wherein said first solution has a pH of substantially 3 to 10 and said scond solution has a pH of substantially 3 to 7.

7. The process as defined in claim 1, wherein said first solution is composed of conventional coupling components selected from the group consisting of o- and m-phenyldiamine, o- and m-aminophenol, o-anisidine, 2,4-diaminoanisol, 2,3- and 2,4-diaminotoluene, 2,4-diaminophenol, pyrogallol, resorcinol, aminoresorcinol, 1,2-dihydroxybenzene, 1,5-dihydroxynaphthalene, 1,5- and 1,8-aminohydroxynaphthalene, alpha-naphthol and 1-phenyl-3-methylpyrazolone-5.

References Cited

UNITED STATES PATENTS 2,553,375   5/1951   Kirst _____ 8—10

ALBERT T. MEYERS, Primary Examiner

V. C. CLARKE, Assistant Examiner

U.S. Cl. X.R.

8—10, 10.2, 11; 260—141, 142